(12) United States Patent
Malik

(10) Patent No.: US 7,263,535 B2
(45) Date of Patent: Aug. 28, 2007

(54) RESOURCE LIST MANAGEMENT SYSTEM

(75) Inventor: Dale W. Malik, Dunwoody, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 549 days.

(21) Appl. No.: 10/223,858

(22) Filed: Aug. 19, 2002

(65) Prior Publication Data

US 2003/0220946 A1 Nov. 27, 2003

Related U.S. Application Data

(60) Provisional application No. 60/382,106, filed on May 21, 2002.

(51) Int. Cl.
G06F 17/30 (2006.01)
G06F 15/16 (2006.01)

(52) U.S. Cl. .......................... 707/200; 707/2; 707/203; 709/208; 709/219

(58) Field of Classification Search ................ 707/2, 707/203; 709/206, 219, 229, 250; 715/753; 379/202.01; 455/412.1
See application file for complete search history.

(56) References Cited

U.S. PATENT DOCUMENTS

| | | | |
|---|---|---|---|
| 5,276,901 A | 1/1994 | Howell et al. | |
| 5,721,906 A | 2/1998 | Siefert | |
| 5,761,669 A | 6/1998 | Montague et al. | |
| 5,793,365 A | 8/1998 | Tang et al. | |
| 5,884,172 A | 3/1999 | Sawyer | |
| 5,926,816 A | 7/1999 | Bauer et al. | |
| 5,941,947 A | 8/1999 | Brown et al. | |
| 6,085,191 A | 7/2000 | Fisher et al. | |
| 6,182,142 B1 | 1/2001 | Win et al. | |
| 6,189,036 B1 | 2/2001 | Kao | |
| 6,192,361 B1 | 2/2001 | Huang | |
| 6,233,618 B1 | 5/2001 | Shannon | |
| 6,275,825 B1 | 8/2001 | Kobayashi et al. | |
| 6,311,205 B1 | 10/2001 | Dutcher et al. | |
| 6,366,915 B1 | 4/2002 | Rubert et al. | |
| 6,381,579 B1 | 4/2002 | Gervais et al. | |
| 6,405,035 B1 | 6/2002 | Singh | |
| 6,405,202 B1 | 6/2002 | Britton et al. | |
| 6,408,336 B1 | 6/2002 | Schneider et al. | |
| 6,415,318 B1 | 7/2002 | Aggarwal et al. | |
| 6,453,353 B1 | 9/2002 | Win et al. | |
| 6,487,667 B1 | 11/2002 | Brown | |

(Continued)

OTHER PUBLICATIONS

Patent Application entitled: Instant Messaging Architecture and System for Interoperability and Presence Management; U.S. Appl. No. 10/135,929, filed Apr. 29, 2002.

*Primary Examiner*—Tony Mahmoudi
(74) *Attorney, Agent, or Firm*—Thomas, Kayden, Horstemeyer & Risley, LLP

(57) ABSTRACT

A system for providing group accessibility is provided. A representative resource list management system includes a group management system operable to store a resource list for a user, and a service manager operable to detect a status of a contact associated with the resource list. The resource list includes at least one group, the at least one group including a plurality of contacts. The service manager is operable to update accessibility of the at least one group in response to at least one of the plurality of contacts being accessible on a network. Methods and other systems for resource list management are also provided.

35 Claims, 6 Drawing Sheets

U.S. PATENT DOCUMENTS

| | | |
|---|---|---|
| 6,510,466 B1 | 1/2003 | Cox et al. |
| 6,564,261 B1 * | 5/2003 | Gudjonsson et al. ....... 709/227 |
| 6,601,009 B2 | 7/2003 | Florschuetz |
| 6,604,133 B2 | 8/2003 | Aggarwal et al. |
| 6,677,968 B1 | 1/2004 | Appelman |
| 6,785,728 B1 | 8/2004 | Schneider et al. |
| 6,870,830 B1 * | 3/2005 | Schuster et al. ............ 370/352 |
| 6,874,061 B1 * | 3/2005 | Bridge ....................... 711/114 |
| 6,935,951 B2 * | 8/2005 | Paulsen et al. ............... 463/25 |
| 7,016,978 B2 | 3/2006 | Malik et al. |
| 2002/0035605 A1 * | 3/2002 | McDowell et al. ......... 709/206 |
| 2002/0069247 A1 | 6/2002 | Paknad et al. |
| 2002/0083134 A1 | 6/2002 | Bauer et al. |
| 2002/0087678 A1 | 7/2002 | Padilla |
| 2002/0087704 A1 | 7/2002 | Chesnais et al. |
| 2002/0102965 A1 | 8/2002 | Mandahl et al. |
| 2002/0112054 A1 | 8/2002 | Hatanaka |
| 2002/0118809 A1 | 8/2002 | Eisenberg |
| 2002/0130904 A1 * | 9/2002 | Becker et al. .............. 345/753 |
| 2002/0184357 A1 * | 12/2002 | Traversat et al. ........... 709/223 |
| 2003/0018726 A1 | 1/2003 | Low et al. |
| 2003/0023476 A1 * | 1/2003 | Gainey ........................ 705/10 |
| 2003/0041000 A1 | 2/2003 | Zajac et al. |
| 2003/0041154 A1 | 2/2003 | Tran |
| 2004/0003132 A1 * | 1/2004 | Stanley et al. .............. 709/316 |
| 2004/0064332 A1 * | 4/2004 | Zou et al. ..................... 705/1 |
| 2004/0093595 A1 | 5/2004 | Bilange ..................... 717/171 |
| 2004/0128245 A1 * | 7/2004 | Neal et al. ................... 705/40 |
| 2004/0148228 A1 * | 7/2004 | Kwei .......................... 705/26 |
| 2005/0021467 A1 | 1/2005 | Franzdonk |
| 2005/0164783 A1 * | 7/2005 | Paulsen et al. ............... 463/29 |
| 2005/0165817 A1 * | 7/2005 | O'Conor ..................... 707/101 |
| 2005/0210263 A1 * | 9/2005 | Levas et al. ................ 713/182 |

* cited by examiner

RESOURCE LIST MANAGEMENT SYSTEM

CROSS-REFERENCE TO RELATED APPLICATION

This application claims priority to now abandoned U.S. provisional application entitled, "INTEGRATION OF INSTANT MESSAGING AND COMPUTER OPERATING SYSTEMS," having Ser. No. 60/382,106, filed May 21, 2002, which is entirely incorporated herein by reference.

FIELD OF THE INVENTION

The present invention is generally related to telecommunications and more particularly to services provided to clients via instant messaging applications.

DESCRIPTION OF THE RELATED ART

The development of the internet has driven vast technological developments, particularly in the areas of networking hardware and software. Networking hardware developments have enabled networks to transfer large files in fractions of a second. Software developments, such as the world-wide-web (web) and e-mail, have facilitated communications over these networks that have allowed users to remain in almost constant contact with work. These types of communications have become of utmost importance in the business setting, where response time has become a key survival factor for many companies. Other networking software has allowed users to access and run applications from remote locations, thus enabling a businessperson to remain more productive, even on a business trip.

Moreover, the internet has changed the way people communicate. E-mail has become the dominant means of communications in many settings, being preferred over traditional mail, and even telephones in some cases. Almost instantaneous communication with little charge has driven much of the popularity of e-mail. Once used only in university and military settings, e-mail has gained widespread public acceptance.

In a world economy based largely upon communication, the relative speed of e-mail in comparison to traditional mail is often not fast enough or as effective. Demand for faster access to more information has resulted in the development of a number of instant messaging (IM) services. IM brings presence information into the communications arena, and it allows users to have real-time chat sessions with other users who are present on the system. The real-time nature of IM has led to quick acceptance by many in the business community of IM as an invaluable tool for communication. However, current IM systems often have administration and management problems.

Therefore, there is a need for systems and method that address these and/or other perceived shortcomings of the prior art.

SUMMARY OF THE INVENTION

One embodiment, among others, of the present invention provides systems and methods for managing group accessibility. A representative system includes a group management system operable to store a resource list for a user, and a service manager operable to detect a status of a contact associated with the resource list. The resource list includes at least one group, said at least one group including a plurality of contacts. The service manager is operable to retrieve said at least one group from the persistent database when at least one of the plurality of contacts is accessible on a network A method, among others, for managing a resource list includes: sending a request to a persistent database to retrieve a resource list associated with a user, the resource list comprising a plurality of contacts including at least one group; receiving the resource list; checking a non-persistent database for at least one member associated with said at least one group; and notifying the user about which of the plurality of contacts are accessible, and which of said at least one groups is accessible.

An alternative method, among others, for managing a contacts includes: creating a resource list, comprising a plurality of contacts; grouping a plurality of members from the plurality of contacts into at least one group; and setting a rule to define accessibility of the group.

Other systems, methods, features, and advantages of the present invention will be or become apparent to one with skill in the art upon examination of the following drawings and detailed description. It is intended that all such additional systems, methods, features, and advantages included within this description and within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1A:
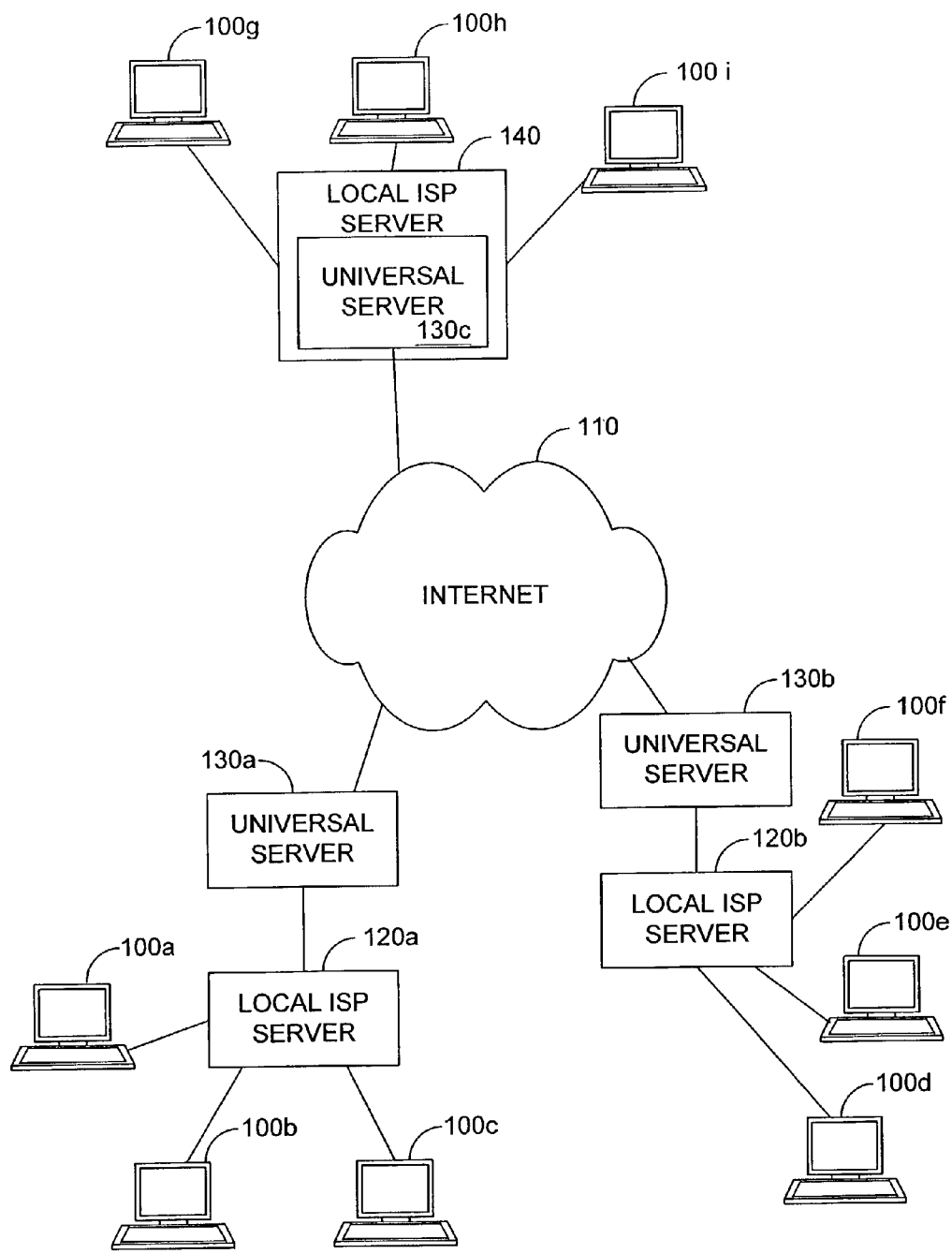
FIG. 1A is a block diagram illustrating an interoperability architecture for instant messaging used in one embodiment, among others, of the present invention.

Referring now to FIG. 1A, shown is a block diagram illustrating an interoperability architecture for instant messaging used in one embodiment, among others, of the present invention. Each of a plurality of remote computers 100a-i access a network 110 through a local internet service provider (ISP) server 120a, 120b, 140. The local ISP 120a, 120b, 140 can offer network 110 access through myriad connection types, including a digital subscriber line (DSL) service, an integrated services digital network (ISDN) service, an analog dial-up service, ethernet, T-1, or any other service for transmitting data through a network 110. Universal servers 130a-c are located between the internet and each of local ISP servers 120a, 120b, and located inside local ISP 140. These universal servers 130a-c provide interoperability between a plurality of proprietary instant messaging clients 100a-i. Of course, the scope of the presentation includes networks other than those with universal servers or instant messaging.

Figure 1B:
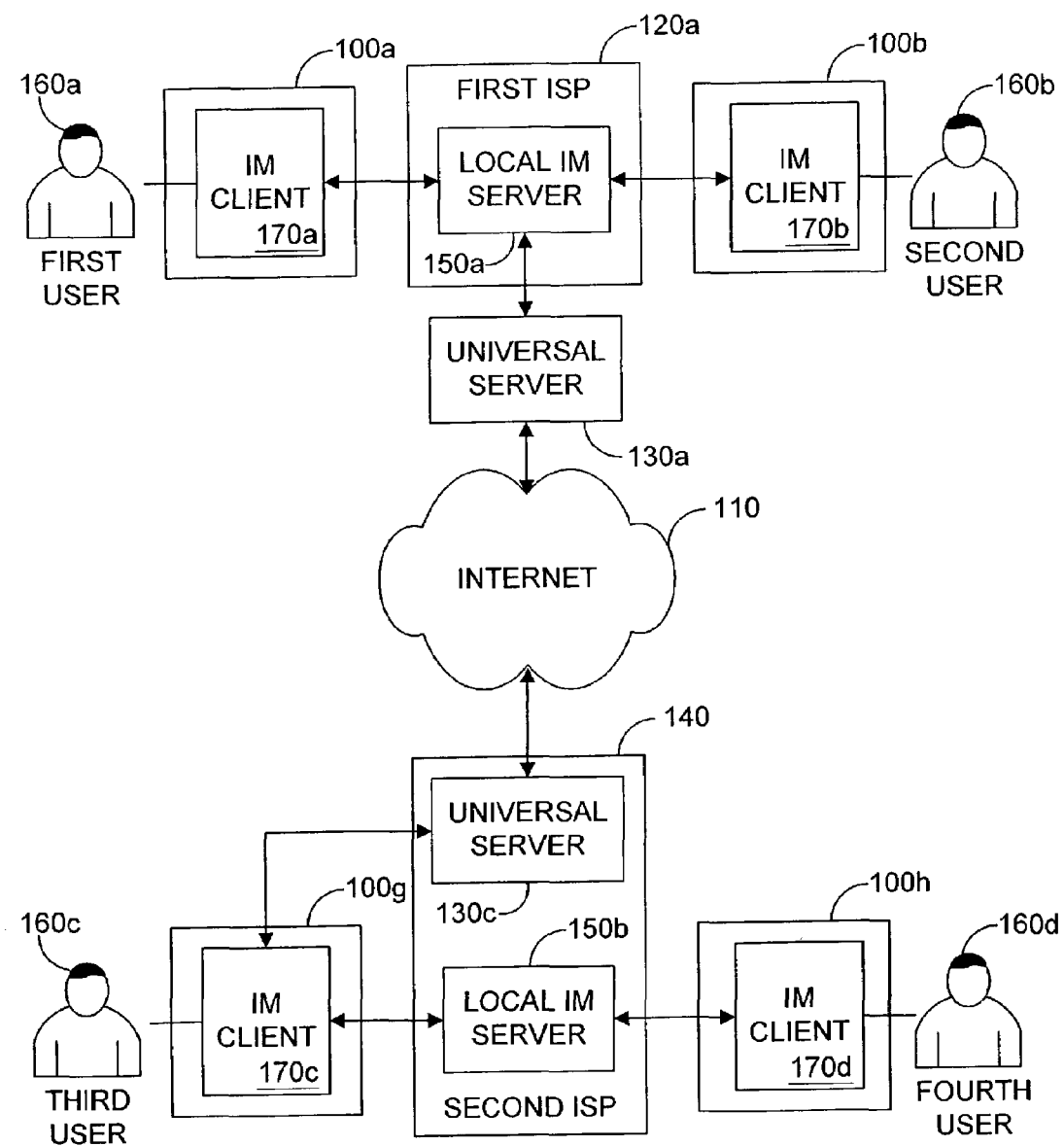
FIG. 1B is a block diagram illustrating an alternative embodiment, among others of an interoperability architecture for instant messaging used in one embodiment, among others, of the present invention.

Referring now to FIG. 1B, shown is an illustration of an alternative embodiment, among others, of a universal architecture. Greater detail regarding this interoperability architecture may be found in U.S. patent application Ser. No. 10/135,929, entitled "Instant Messaging Architecture and System for Interoperability and Presence Management," which is hereby incorporated by reference. The universal architecture uses a universal protocol, such as the extensible markup language (XML) protocol to allow users of different ISPs 120a, 140 that use proprietary protocols to communicate with one another. Universal servers 130a, 130c located at each of the ISPs 120a, 140 are the key feature of the universal architecture. FIG. 1B illustrates two separate ISP networks 120a, 140. The discussion of the ISP 120a, 140 will be limited to the components that provide the universal service.

The ISP 120a contains a local IM server 150a, and is connected to the universal server 130a. The local IM server 150a provides the standard IM function for the ISP 140a. The universal server 130a provides the universal function that allows the first user 160a, who is registered with the first ISP 120a, to communicate with a second user 160b registered with the second ISP 140. The first ISP 120a provides connections to a plurality of clients 170a, 170b on computers 100a, 100b, which allows users 160a, 160b to access the proprietary IM and universal functions of the ISP 120a. The first ISP 120a is "bimodal," in that it uses both a proprietary and universal format to provide a proprietary IM function that only allows the users who are registered with the ISP 120a to send and receive instant messages. For example, if only one user has registered with the universal server 130a, then the local IM server 150a will transfer instant messages between the first and second users 160a, 160b using the proprietary protocol. However, if both the first and second users 160a, 160b are registered with the universal server 130a, then the first ISP 120a can transfer instant messages between them using the universal protocol. By supporting both formats at the first ISP 120a, users can migrate to the universal format over time. When all users 160a, 160b have migrated the proprietary format can be discontinued.

The universal server 130a removes the restrictions associated with proprietary IM functions associated with the ISP 120a. The universal server 130a uses a universal format, such as XML, or any other suitable format, that allows users 160a, 160b registered with an ISP 140a, such as BellSouth DotNet, to send and receive instant messages from other users 160c, 160d registered with another ISP 140b, such as America Online (AOL).

The user 160a accesses the local IM server 150a of the ISP 120a through the IM client 170a located on the user's computer 100a. The IM client 170a typically includes a proprietary software program that is capable of opening communications sockets that allow the IM client 170a to communicate with the local IM server 150a using either the proprietary or universal protocols. The software program is capable of formatting an instant message sent from the IM client 170a to the appropriate format used by the IM function of the ISP 120a. In this manner, the user 170a is capable of communicating with any other user 160b registered with the ISP 120a. However, the local IM server 150a on a first ISP 120a is also connected to a first universal server 130a. The first universal server 130a is in turn, connected to a second universal server 130b on the second ISP 140b via a distributed network, such as the internet 110. This allows the user 160a to communicate not only with the user 160b who is registered with the first ISP 120a, but also with users 160c who are registered with the second ISP 140 that uses a different proprietary IM protocol to send and receive instant messages within the network of the second ISP 140.

In order for the first user 160a to be able to send and receive messages with a third user 160c on the second ISP 140, the IM client 170a must be able to identify the IP address and presence information associated with the third user 160c. The presence information for the third user 160c is stored on the universal server 130a connected to the first ISP 120a. The universal server 130a on the first ISP 120a stores the IP address and presence information for the third user 160c. Therefore, the first user 160a, who is registered with the universal server 130a on the first ISP 120a has access to the IP address and presence information of the third user 160c.

One skilled in the art will recognize the difference between the first local ISP 120a and the second ISP 140. The second local ISP 140 is an alternative embodiment that includes within the ISP 140 both the universal server 130c and a local IM server 150b. Here, the local IM server 150b does not communicate with the universal server 130c. Thus, the first user 160a will not be able to communicate with a fourth user 160d if the fourth user 160d is not registered with the universal server 130b, but instead is only registered with a local IM server 150b. As a result, the fourth user 160d is able to send and receive instant messages using only the proprietary format over local IM server 150b. Therefore, the user 160d is limited to communicating via instant messages with users of the second ISP 140b, such as the third user 160c.

An advantageous feature of the universal architecture is that it is designed to be easily integrated within existing ISPs 120a, 140, such as AOL and Microsoft Network (MSN) without disrupting the current IM function of these ISPs 120a, 140. Each ISP 120a, 140 that adopts the universal architecture requires only a slight modification to the existing network. The ISP 120a, 140 either adds a universal server 130a between the local IM server 150a and the internet 110, or adds an additional server to function as the universal server 130b and can install a universal application program on the local IM server 150a, 150b and each IM client 170a-d attached to the network. The universal application program that is installed at each ISP 120a, 140 converts the ISP 120a, 140 to function as "bimodal." That is, the ISP 120a, 140 is capable of using the proprietary IM protocol of the local IM server 150a, 150b and the universal protocol of the universal architecture. The bimodal nature of the universal architecture allows the universal server 130a, 130b to be implemented into existing ISPs 120a, 140 such as AOL and MSN without disrupting the current proprietary IM functions of those services. This allows the current users 160a-d to, continue using the proprietary IM function of their particular ISP 120*a*, 140 until every user 160*a-d* can be converted to the universal protocol.

Figure 2:
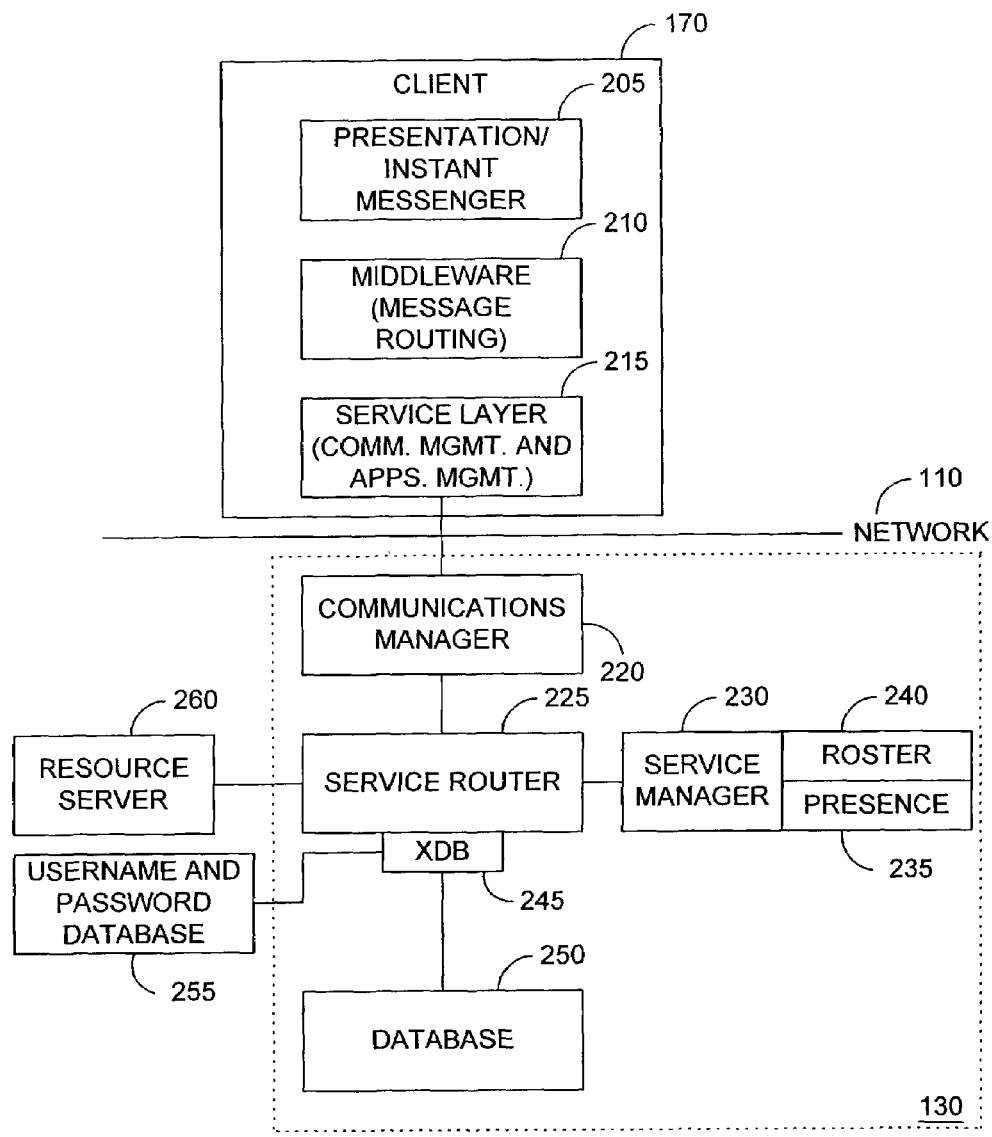
FIG. 2 is a block diagram of the interoperability architecture used in one embodiment, among others, of the present invention.

Referring now to FIG. 2, shown is a block diagram illustrating an embodiment, among others, of the universal server 130 of FIG. 1A & B, which is used in conjunction with an embodiment, among others, of the present invention. The client 170 includes at least three layers of functionality in one embodiment, among others, to communicate with the universal server 130. The first layer is the presentation layer 205. The presentation layer 205 includes the logic that is used to present the instant messenger or another application to a user. The second layer is a middleware layer 210. The middleware layer 210 includes logic used to handle the message routing of the instant messaging application between the presentation layer and the service layer. The third layer is the service layer 215. The service layer 215 handles both the applications management and communications management of the client. The service layer 215 communicates with the communications layer 220 on the universal server 130.

Preferably, there are three basic layers to the instant messaging service. The first layer is the communications manager (CCM) 220. The communications manager 220 manages the connections between the client communications manager 215 and the universal server 130. In one embodiment, among others, of the universal server 130, communications between the client service layer 215 and the universal server 130 communications manager 220 occur in extensible markup language (XML). Further, the communications may be secure socket layer (SSL) encrypted for security. Moreover, the communications can be compressed by a compression/decompression algorithm implemented on a compression-decompression module, more commonly referred to as a CODEC, to provide faster data transfer.

The communications manager 220 includes a number of connection sockets between the communications manager 220 and a plurality of users. The communications manager 220 can further include a load balancer (not shown) to balance the connections over a number of different communications managers. The load balancer can maintain a connection to the same connection socket during the period while the user is logged on and connected to an operable communications manager 220, and can automatically connect the user to an alternate connection socket when a communications manager might fail. Thus, a continuous connection can be maintained during an active session despite hardware failures. The load balancer can also protect the server against denial of service attacks, which have become increasingly prevalent on the internet.

A standard communications manager 220 will typically attempt to recover and reallocate a connection socket after a period of time with no activity from the client 170. In this situation the communications manager 220 assumes that the client is no longer present on the system. However, because presence is an important piece of the instant messaging architecture, the communications layer 215 on the client-side sends a signal to the universal server 130 to keep the connection socket active on the communications manager 220.

The second layer is the service router 225, with one example known as a JabberD in the Jabber architecture, such as that available from Jabber, Inc. of Denver, Colo., which performs a similar function to the message router 210 on the client side of the network. A number of different service managers 230 can be coupled to the service router 225, each of which can provide a different service to the client 170 over the internet. Thus when a service is requested, the service router 225 routes the request to the requested service manager 230. In the instant messaging architecture the service manager 230 is a Jabber service manager (JSM) which allows text communication between parties. The JSM 230 also keeps track of presence and roster information 235, 240, respectively, for a particular user on the network who has logged into the instant messaging system. Presence 235 typically refers to the user's status on the network, while roster 240 typically refers to the status on the network of those on the user's resource list.

Similarly to the communications manager 220, the service router 225 can utilize a self-similar architecture using the CODEC (not shown) and load balancer (not shown) to optimize the connection between the communications manager 220 and the service router 225. Use of the CODEC enables high speed data transmission between the communications manager 220 and the service router 225. The load balancer provides a robustness that allows the client to maintain contact with a selected service manager 230 during a session.

In one embodiment, among others, of the universal server 130, the database containing the non-persistent data, such as presence and roster information 235, 240, can be severed from the service manager 230. The presence information 235 typically includes a list of all users who are registered with the universal server 130, while the roster list includes a non-persistent list of those resource which are present on the network. Thus, the non-persistent data can be maintained and updated at a single database, and the plurality of service routers 225 can connect to the same presence information 235. After severing this database from the service manager 230 the service manager 230 can be equipped, as described above, with a CODEC (not shown) and load balancer (not shown), again utilizing a self-similar architecture to provide quality of service and communication efficiencies.

The service router 225 is further coupled, in one embodiment, among others, to an XML database (XDB) library 245. The XDB library 245 is used as a translator such that the service router 225 can communicate with a database system 250 that includes persistent data relating to a plurality of clients. The database system 250 which contains most of the persistent data for the services on the network, such as resource lists, preferences, etc. In one embodiment, among others, of the universal server 130 the database system 250 can be an Oracle 9i database. The XDB library 245 can be further coupled to an authentication server, such as a username and password database 255. Thus a username and password can be required before the user is authenticated and allowed to access the database system 250 for any profile information.

After registering with the database system 250, the user is provided with a resource list. The client 170 can then contact the service manager 230 to find out which of the resources on the resource list is present and/or available on the network. Typically, presence refers to the registration state of a client 170. If a client 170 is logged-in to the network, the client 170 is present on the network. Typically, availability refers to the status of a user at the client computer. A user can be made unavailable by the network if there has been no activity on the client computer 170 for a period of time. Otherwise, a client 170 can be made unavailable by user choice, if the user does not wish to be disturbed. One skilled in the art will recognize that these are merely definitions of various states that can be defined according to any specific implementation of the presence and roster databases 235, 240. Furthermore, these databases 235, 240 that contain non-persistent information could keep track of any other states that might be defined by the specific implementation of the service manager 230.

Typically with respect to other instant messaging systems, the resource list only comprises a list of other users for which the client 170 wishes to know the status. However, the resource list of some embodiments of the present invention could include access to a plurality of applications, and there could be multiple service managers that include managers for the plurality of applications coupled to the service router 225. These service managers could provide access to a multitude of different applications and resources, such as Microsoft Word and/or Visio, provided by Microsoft Corp. of Redmond, Wash., and/or billing entry applications, etc. Moreover, the Jabber service manager 230 could keep track of the presence of these other applications and other resources on the network. For example, if a client wished to access an e-mail account from a remote location and the system was down, the Jabber service manager 230 could alert the user that the server was down. Thus the client 170 would not waste resources searching and waiting for e-mail from a server that is off-line.

Thus, Jabber can be used similarly to an operating system. When a resource server 260 is present on the network, the resource(s) associated with that resource server can be displayed as an icon on the client computer display, and when a resource server is down, the resource(s) can be removed from the client computer 170 display. Thus, icons, for example, could appear and disappear from a client computer 170 display as they become present and available, and not present or unavailable. Selecting the icon while it is displayed will cause a routing request to be sent to the service router 225. Upon receiving the routing request, the service router 225 will determine the correct routing of the routing request and deliver the proper service to the client computer 170.

Figure 3:
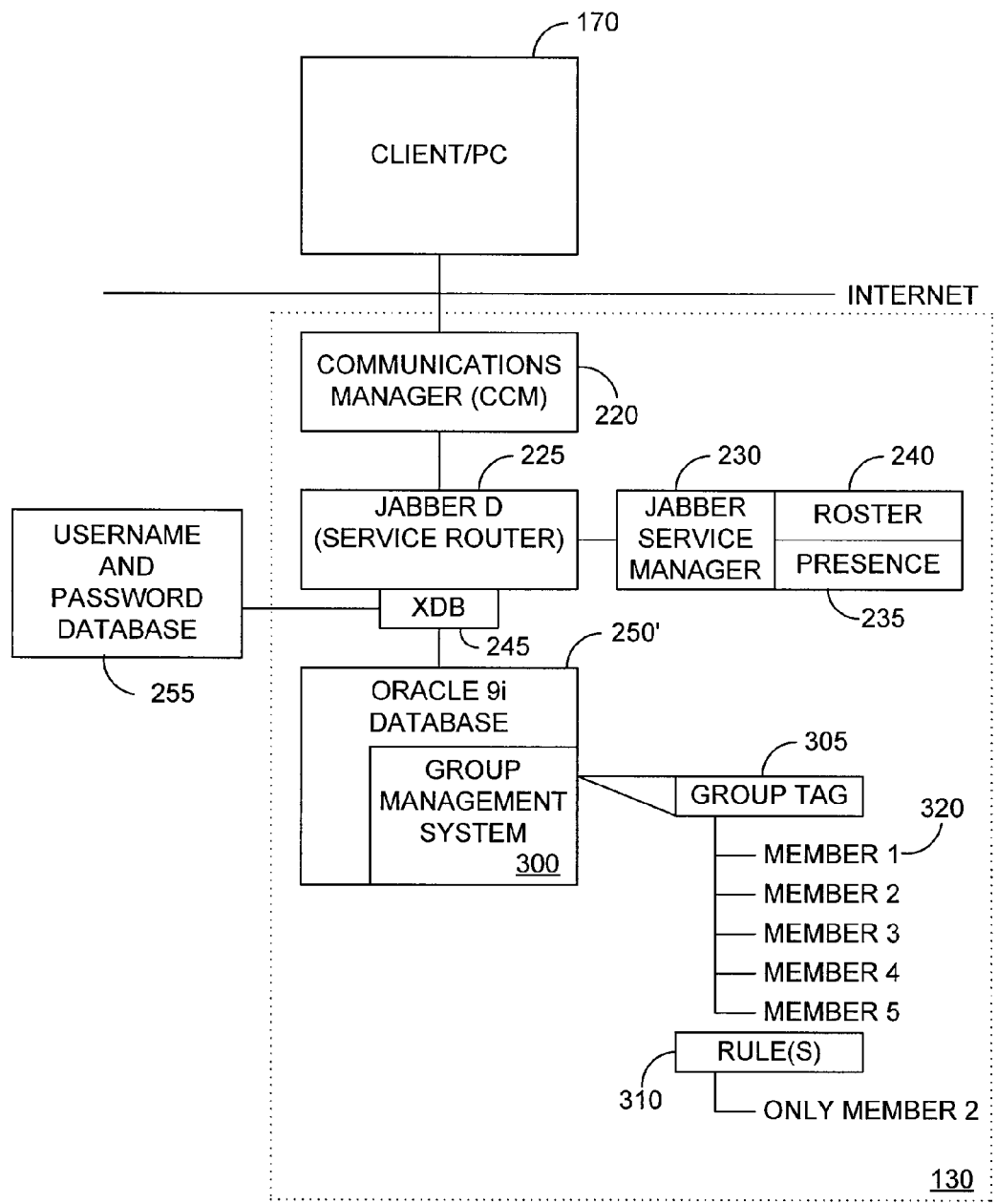
FIG. 3 is a block diagram of one embodiment, among others, of a system for providing group accessibility in accordance with the present invention.

Referring now to FIG. 3, shown is an embodiment, among others, of a system for providing group accessibility. Here, the system uses a group management system 300 in conjunction with the universal server 130 of FIG. 2 to provide group accessibility. The group management system 300 allows a group to be created in the persistent database 250' under a group tag 305. The group is similar to a newsgroup, where groups can be organized by topic and separated from one another. Moreover, the group in alternative embodiments can be created by a centralized administrator or by an individual.

Once the group tag 305 is created, the group management system 300 can be configured, in one embodiment, among others, to allow a user to retrieve a resource list and send the resource list, including the group tag 305, to the Jabber service manager 230 roster database 240. The service manager 230 can be set up to display a group tag 305 as present when at least one member 320 of the group is logged onto the universal server 130. Thus, when a user logs-in to the server and receives the resource list, which can include the group tag 305, and checks the status of the group tag 305, the group tag 305 will be present when at least one of the members 320 included within the group tag 305 is logged on to the universal server 130. Furthermore, the universal server 130 can be configured to provide the client 170 with a specific number of members of the group who are present and available. Thus, when an icon which can indicate accessibility of the group can also indicate how many members of the group are accessible.

In an alternative embodiment of the group management system 300, a group could comprise a department identification, for example. When a user wishes to contact a specific member in that departmental group, the user could merely type that member's identification and temporarily bring that group member outside of the group to get status information and/or begin a chat session with that group member.

In another embodiment of the group management system 300, the user may enter a rule 310 into the persistent database 250' that gets read up to the Jabber service manager 230 when the group tag 305 is read up to the non-persistent roster 240. The Jabber service manager 230 can execute the rule 310 and show the presence of a group on the client computer 170 display when the rule 310 is met. Thus, the system can be configured to indicate presence only when a particular member 320 of the group is present on the universal server 130, according to a rule 310 entered by the user.

One such example where this feature would be useful is the situation where a customer cheats with a member 320 of the service center group 305. The customer can set their profile in the persistent database 250' to make the service center group 305 appear present only when that same particular service center group member 320 is present. Thus the customer can later chat with the same service center group member 320 and retain some continuity in service. Moreover, the service manager 230 can, in one embodiment, among others, be designed to automatically add a service group 305 to the user's profile following a service call. The service manager 230 can further set the rule 310 such that the client 170, can only reconnect with the same service center group member 320.

One skilled in the art will recognize that multiple group members 320 can be singled out in a rule 310 to indicate presence of the group, or that the user could set the rule 310 so that the group appears present when a first, third and fourth group member are all present at the same time. This rule can be set by the user through the client 200, the client being operable to generate user screens and prompts, and to send commands to the universal server 130. There are myriad possible combinations to enable a group to appear present according to presence status of the group's individual members 320, and each of those combinations are intended to be included within the scope of the present invention.

One skilled in the art will further recognize that in the instance where the group is a blind list (e.g. help desk, service center, technical assistance) and a user merely chooses the group (instead of an individual within the group), it would be helpful to include a rule which rotates among the group. Therefore, when there are five members available at the help desk, the first member does not receive a disproportionate number of the inquiries. This feature can be facilitated using a rule that correlates to a tag number associated with a group member's identification, and the service manager receiving the request can distribute the requests among group members by rotating numerically. Alternatively, the service manager 230 could rotate requests alphabetically. However, such an alphabetical sort typically requires more processing power than a numerical sort.

Figure 4:
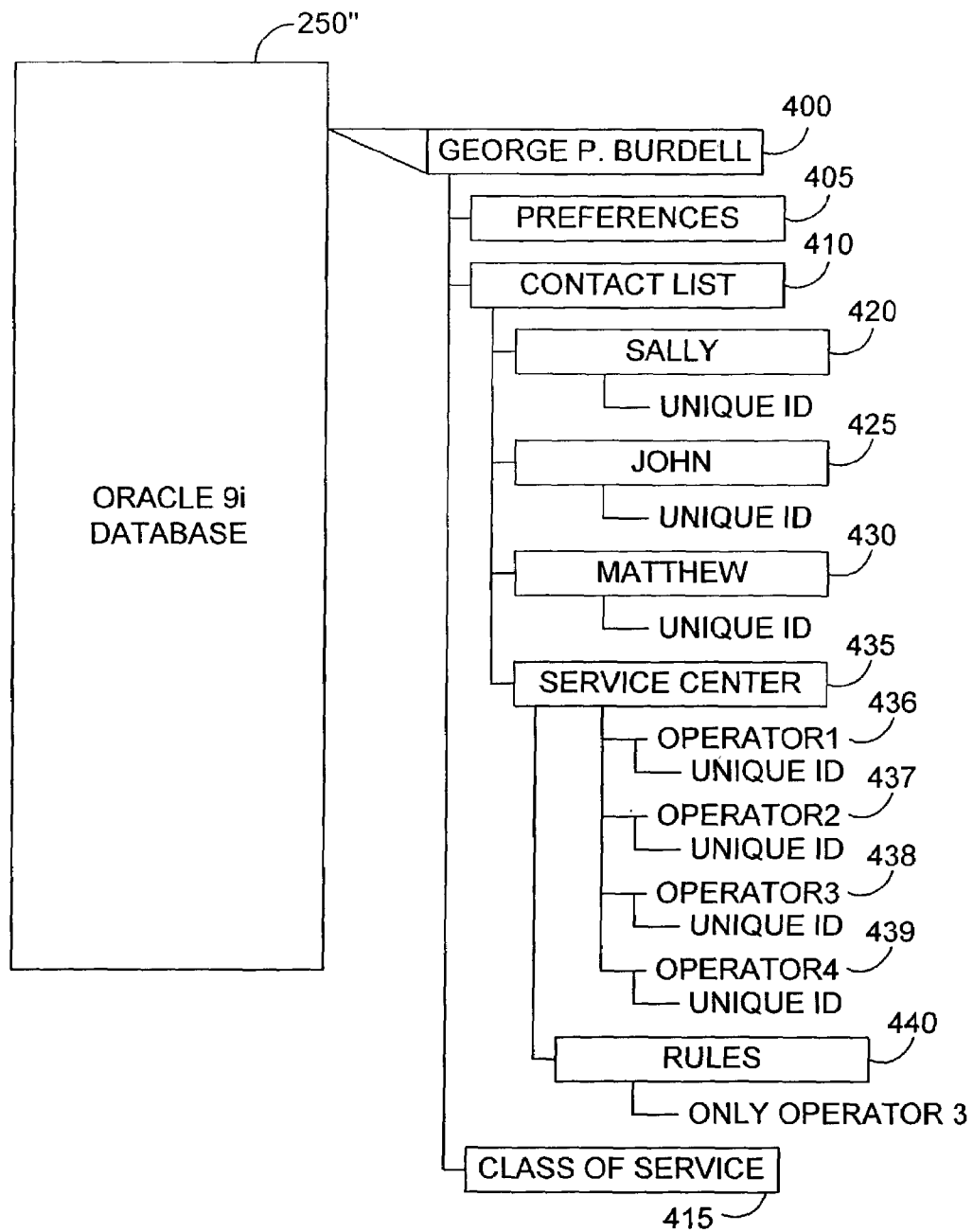
FIG. 4 is an embodiment, among others, of a data structure used to store groups and manage the presence of groups facilitated by the system of FIG. 3.

Referring now to FIG. 4, shown is an embodiment, among others, illustrating a data structure used to store the group and manage group presence of FIG. 3. The database typically contains a number of different user profiles 400. Each of the user profiles 400 contain a information stored by the user associated with the profile 400. For example, the profile 400 may contain preference information 405, a resource list 410, and a class of service marker 415.

The preference field 405 could contain the preferences of the user. In one embodiment, among others, the user could specify to the universal server 130 that the user would like an aural notification when a user on the resource list 410 has become available. As recognized by one skilled in the art, these preferences could take many forms, and this invention is not meant to be limited merely to those preferences disclosed.

With regard to the resource list 410, the user can specify a number of contacts 420, 425, 430, 435 at his or her pleasure. Typically, these contacts 420, 425, 430, 435 are those people with whom the user often communicates. The contacts listed fall into two categories, individual contacts 420, 425, 430 and group contacts 435. Each of the individual contacts 420, 425, 430 has a unique identifier associated with the individual contact 420, 425, 430. The group contact 435, a service center in this example, has a number of operators 436-439 listed. Each of the operators 436-439 has a unique identifier associated with the operator 436-439. These unique identifiers in alternative embodiments may or may not be viewable by the user. Moreover, the service center group 435 has a rule 440 associated with it. The rule 440 in alternative embodiments can be set by the universal server 130 or the user him/herself. The rule 440 in this embodiment tells the service manager 230 (FIG. 3) that the group is only present when operator 3 438 is present and available.

With respect to the class of service marker 415, the class of service marker may be used by the database 250" administrator to restrict access to various resources. These resources can be other users, applications residing on a server 260 coupled to the service router 225, or even a network connection socket. The class of service marker 415 would be read up to the client 170 upon a user logging in to the database 250", and would be included with every service request received from the client 170. It should be recognized that the class of service marker 415 can be used to facilitate a variety of different advantageous transactions, including both commercial and security driven transactions. It should be further recognized that the above data structure is merely an example of one structure that can be used, and the structure is set out only to more clearly explain the invention, rather than limit the invention.

Figure 5:
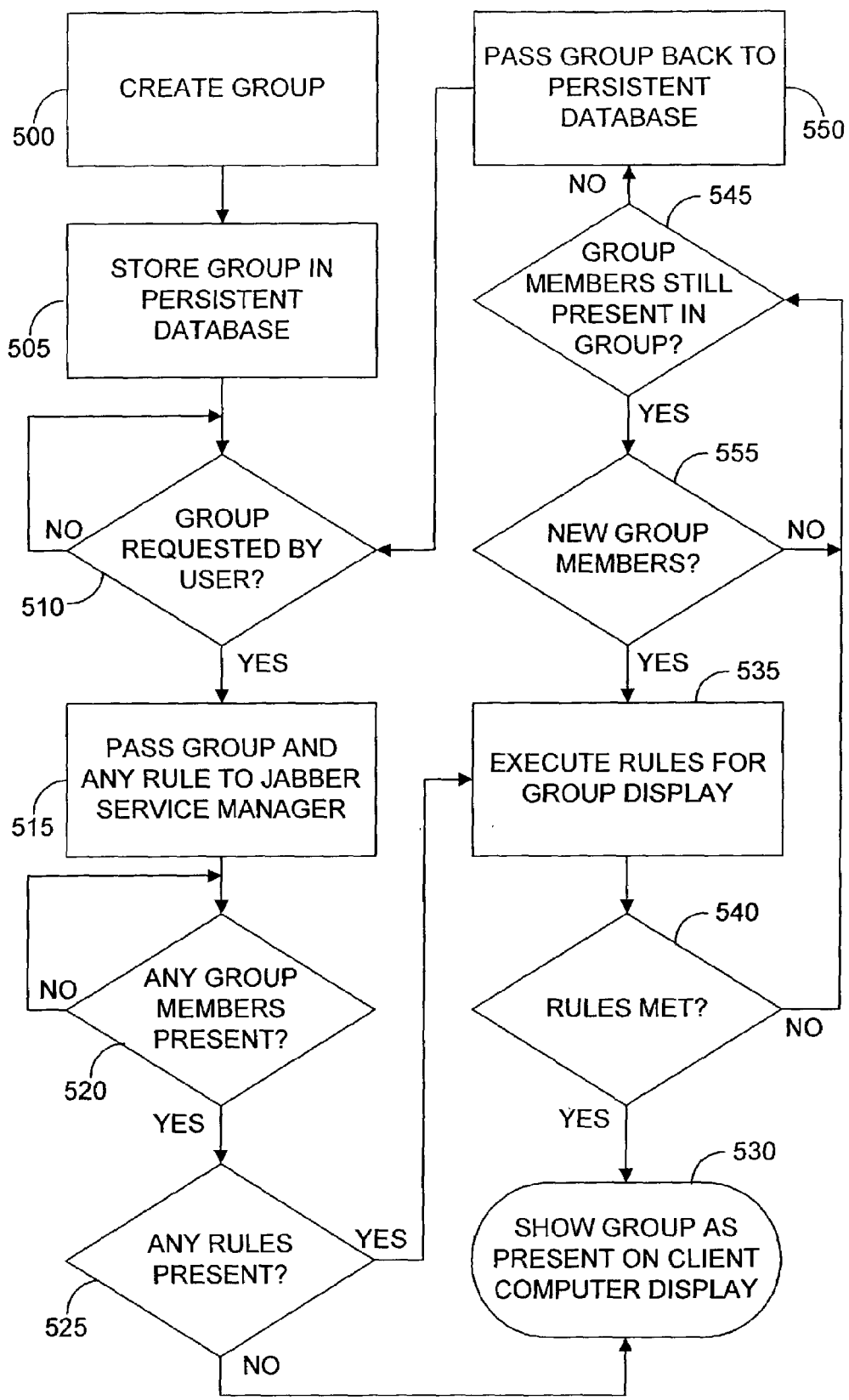
FIG. 5 is a flowchart illustrating operation of the system of FIG. 3.

Referring now to FIG. 5, shown is an embodiment, among others, of a flowchart illustrating the operation of the universal server including an embodiment, among others, of the group management system 300 of FIG. 3. The first step 500 is to create a group 305. Typically the group 305 can be created by a centralized administrator, although it can also be created by a client 170, or both a centralized administrator and a client 170. In the next step 505, the group is stored in the persistent database 250.

After the group 305 is stored in the persistent database 250, in the next step 510, the group management system 300 checks waits for a client 170 to request the group 305. If there has been no request, the group management system 300 continues checking for a group member 320 until one becomes present. When a group is requested, the next step 515 is to have the database pass the group 305 and any stored rules 310 to the service manager 230. In accordance with the next step 520, the service manager 230 then checks to see whether any group members are present. If there are group members present, in accordance with step 525 the service manager 230 checks to see if a rule 310 was passed up. If there was no rule 310 included with the group 305, the next step 530 is for the service manager 230 to show the group 305 as present on the client computer 170 display.

If there is a rule 310 that was passed up with the group 305, the service manager 230 executes the rule 310, in accordance with step 535. Then if the rule 310 is met, the next step 540 is to have the service manager 230 display the group 305 as present on the client computer 170 display. However, if the rule 310 is not met, the service manager 230 in the next step 545 checks to see that there is still a member 320 of the group 305 present. If there are no group members 320 present, the group 305 is passed back down to the persistent database 250, in accordance with step 550, and the persistent database 250' waits for a group member 320 to become present. If there are still group members 320 present, the service manager 230 in step 555 checks to see whether there are any new group members 320. If there are no new group members 320, the service manager 230 returns to step 545, and again checks to make sure there are still group members 320. However, if there are new group members 320 the service manager 230 executes the rule 310, and checks to see if the rule 310 is met. If the rule 310 is met with the new group member 320, the service manager 230 displays the group 305 as present on the client computer 170 display.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A method for managing contacts, comprising:
grouping a plurality of members from a plurality of contacts as a group;
setting a rule to define networked accessibility of the group, the networked accessibility of the group based upon network accessibility of members of the group, where an identifier for an individual group member is not viewable by a user; notifying the user as to the network accessibility of the group;

blindly connecting the user with a single member associated with said group upon receiving a request from the user to connect to a group contact associated with said group, wherein the single member is selected from said group by rotating among group members with each request received and the rule comprises requiring a certain subset of members of said group to be accessible before the group is indicated as accessible;

requesting a status on a particular member of said group, said request being a specific inquiry for network status of the particular member; and receiving an update on the status of a particular user within said group.

2. The method of claim 1, wherein a group administrator creates and maintains said group.

3. The method of claim 2, wherein a user can add said group to a profile associated with the user if a class of service marker associated with the user allows said group to be added.

4. The method of claim 1, wherein a system administrator creates and maintains said group.

5. The method of claim 4, wherein a user can add said group to a profile associated with the user if a class of service marker associated with the user allows said group to be added.

6. The method of claim 1, wherein a user creates and maintains said group, with respect to a profile associated with the user.

7. The method of claim 1, wherein the rule comprises requiring at least one member of said group to be accessible before the group is indicated as accessible.

8. The method of claim 1, wherein the rule comprises requiring all group members to be accessible before the group is indicated as accessible.

9. A system for providing group accessibility, comprising:
a group management system configured to store a resource list for a user, said resource list comprising a list of contacts that the user wants to know the network status of, said list of contacts including at least one group contact, wherein the group management system is included in a persistent database; and
a service manager configured to detect a network status of a group contact associated with the resource list, the group contact associated with a plurality of group members, wherein the service manager is further configured to update network accessibility of said group contact in response to at least one of the plurality of group members being accessible on a network where identifiers for each of the plurality of group members are not viewable by the user, wherein the service manager is configured to:
display a status of said network accessibility of said group contact to the user; and
blindly connect a the user with a single member associated with said group contact upon receiving a request from the user to connect to said group contact, the service manager being further configured to rotate among group members with each request received.

10. The system of claim 9, wherein the service manager is configured to notify the user that said group contact is present when at least one group member associated with said group contact is present.

11. The system of claim 10, wherein the service manager is configured to notify the user that said group contact is present and available when at least one group member associated with said group contact is present and available.

12. The system of claim 9, wherein accessibility comprises presence and availability.

13. The system of claim 9, wherein the resource list further comprises a rule associated with said group contact, the rule comprising a basis for determining the accessibility of said group contact.

14. The system of claim 13, wherein the service manager is configured to execute the rule before notifying the user of the status of said group contact.

15. The system of claim 14, wherein the rule associated with the group contact comprises notifying the user that said group contact is accessible when a certain subset of said group members is accessible.

16. The system of claim 14, wherein the rule associated with the group contact comprises notifying the user that said group contact is accessible when all of the plurality of group members are accessible.

17. The system of claim 14, further comprising:
a first class of service marker stored in the group management system and passed to the user upon login, the first class of service marker serving as an indication to a service router which resources are accessible to the user.

18. The system of claim 17, wherein the rule provides a second class of service marker, and is settable via an administrative application which is accessible only to those with an adequate first class of service marker.

19. The system of claim 14, further comprising:
a means for providing a first class of service marker, with the rule serving as a second class of service marker.

20. The system of claim 14, wherein the rule is settable by the user.

21. The system of claim 9, wherein said group contact is created by a system administrator, and the user can add or remove said group contact.

22. The system of claim 9, wherein said group contact is created by the user and may be added or removed from the resource list associated with the user.

23. The system of claim 9, wherein the service manager includes a non-persistent database that updates roster and presence information regarding the user and the resource list.

24. The system of claim 9, wherein the service manager is configured to receive a request from a user to retrieve the status on a single member associated with said group contact, said request being a specific inquiry for network status of the single member.

25. A method for managing a resource list, comprising:
sending a request to a group management system to retrieve a resource list associated with a user, the resource list comprising a plurality of contacts including at least one group contact that the user wants to know the network status of, the group contact associated with a plurality of group members;
receiving the resource list;
checking a non-persistent database for at least one member associated with said at least one group contact; and
notifying the user about which of the plurality of contacts are accessible on a network, and which of said at least one group contacts is accessible on the network where an identifier for an individual group member is not viewable by the user;
receiving a request from the user to connect to said at least one group contact without a request for any specific member of said at least one group contact;
selecting a member of said group contact; and connecting the user with a single member of said group contact, wherein selecting the single member of said group contact comprises:

selecting the single member by rotating through each of the plurality of members of said at least one group contact alphabetically.

26. A method for managing a resource list, comprising:

sending a request to a group management system to retrieve a resource list associated with a user, the resource list comprising a plurality of contacts including at least one group contact that the user wants to know the network status of, the group contact associated with a plurality of group members;

receiving the resource list;

checking a non-persistent database for at least one member associated with said at least one group contact; and notifying the user about which of the plurality of contacts are accessible on a network, and which of said at least one group contacts is accessible on the network where an identifier for an individual group member is not viewable by the user;

receiving a request from the user to connect to said at least one group contact without a request for any specific member of said at least one group contact;

selecting a member of said group contact; and connecting the user with a single member of said group contact, wherein selecting the single member of said group contact comprises:

selecting the single member by rotation through a numbering system, the numbering system associating a number with each of the plurality of members of said at least one group contact.

27. The method of claim 26, further comprising:

providing a rule for determining accessibility in a persistent database.

28. The method of claim 27, further comprising:

executing a rule associated with said at least one group contact; and notifying the user which of said at least one group contact is accessible, according to the rule.

29. The method of claim 28, further comprising:

adding a rule based on an administrative application; and changing the rule based on an administrative application.

30. The method of claim 28, further comprising:

editing a rule base on a user input.

31. The method of claim 26, wherein notifying the user about which of said at least one group contact is accessible occurs when at least one group member associated with said at least one group contact is present.

32. The method of claim 26, wherein notifying the user about which of said at least one group contact is accessible occurs when at least one group member associated with said at least one group contact is present and available.

33. The method of claim 26, further comprising:

using a persistent database to house the group management system.

34. The method of claim 33, further comprising:

checking for accessibility of at least one contact, and notifying the user about which of the plurality of contacts are accessible.

35. The method of claim 26, further comprising:

receiving a request from the user to update status on a particular member of said at least one group, said request being a specific inquiry for network status of particular single member; and providing the user with status on the particular member.

* * * * *